United States Patent Office 3,365,716
Patented Jan. 23, 1968

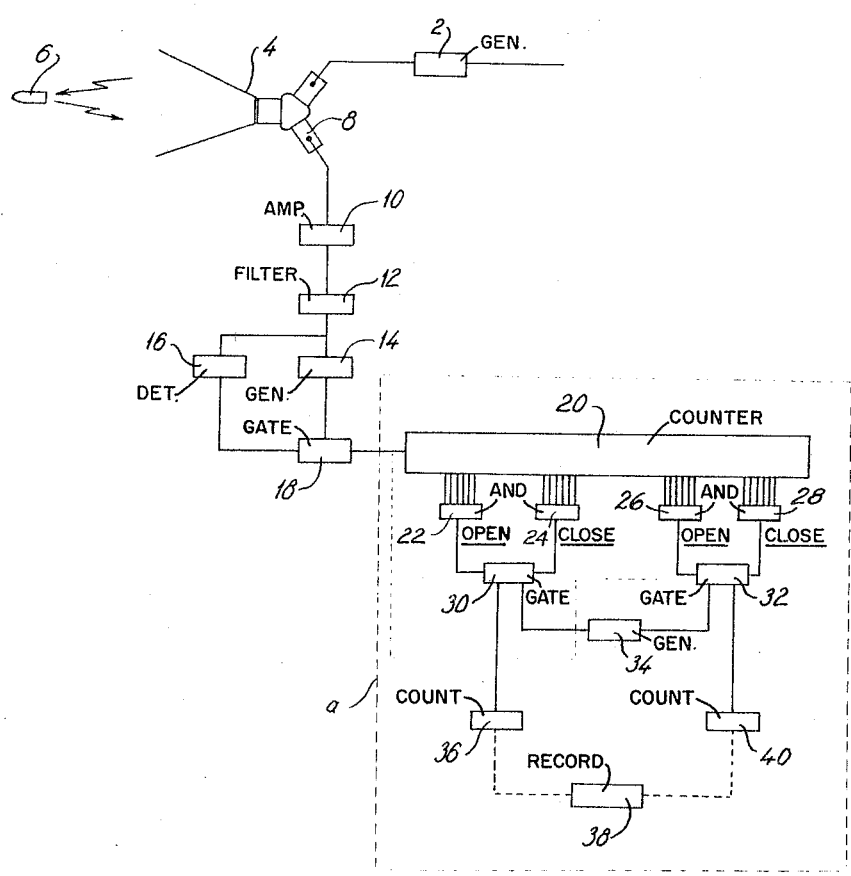

3,365,716
DOPPLER RADAR DEVICES
Tage Jorgensen, 12 Per Kjalsvej, Aarhus, Denmark
Filed June 13, 1966, Ser. No. 557,076
10 Claims. (Cl. 343—8)

ABSTRACT OF THE DISCLOSURE

A Doppler radar device for measuring the velocity of a moving object in different portions of the trajectory thereof including a counter unit for consecutively counting the Doppler oscillations along the entire length of the trajectory which is used for measuring purposes, and measuring means for measuring the Doppler oscillations during a time period subsequent to at least first and second counts in the counter unit.

---

The present invention relates to a Doppler radar device for measuring the velocity of a moving body such as a projectile or a missile.

It is known in the art to use the Doppler principle for measuring the velocity of a moving body by transmitting a high frequency radio wave towards the moving body, receiving the part of the wave being reflected from the body, mixing the transmitted and the received frequencies so as to obtain a low frequency signal due to the small frequency shift in the reflected wave, and registrating the frequency of this signal, called the Doppler signal, which frequency will correspond to the radial velocity of the body seen from the transmitting and receiving antenna. The actual velocity in the trajectory may be calculated when the radial velocity is known.

An accurate measurement of the radial velocity—in the following referred to as the velocity only—is obtained by means of a frequency meter which enables a direct reading of the frequency and thereby the velocity. It is desirable, however, to get still more accurate results, and it is preferred therefore, to make the velocity measurement as a determination of the average velocity measured over one or more short lengths of the trajectory; this determination can be made by means of a counting device either counting the Doppler oscillations within a known time or counting the number of time units such as high frequency periods with known frequency for a known number of Doppler oscillations.

It is often desirable to measure the velocity at spaced points along the trajectory. For example, it has been suggested to use a counting device having two counter sections of which the first is adapted to count a small number of Doppler oscillations and the other section to count a larger number of oscillations. When the first section starts to count, a start impulse is transmitted to a time measuring device, and when this section is counted full, a stop signal to the time measuring device is produced so that the time for this known number of oscillations is registered. Thereafter the counter continues counting the Doppler oscillations in the second counting section, and when this section is counted full after a longer time interval, the counter is automatically reset so as to repeat the counting from zero in the first counter section. Hereby there will again be produced a start and a stop impulse to the time measuring device whereby another velocity measurement will be made. This procedure is repeated as long as Doppler oscillations are present, i.e. several times in uniformly spaced points along the trajectory. Thus it is essential for this method and device that a periodical measurement and counting is repeated along the entire trajectory and that the control impulses for the time measuring device always appear in the same counting stages. The measuring and counting periods are chosen so as to be as adequate as possible for the different practical applications. This means, however, that the measuring conditions are not always optimal, and the method further shows the disadvantage that a possible inaccuracy in the counting will be summed up due to the repetitions of the measuring and counting cycle.

It is the main object of the invention to provide a Doppler radar device enabling the velocity of the moving object to be measured at different points along the trajectory with any desired spacing between these points.

Another object of the invention is to provide a Doppler radar device in which also the length of the single measurement sections of the trajectory may be individually preselected.

A further object of the invention is to provide a Doppler radar device especially applicable for the purpose of determining the muzzle velocity of a gun fired projectile by measuring the projectile velocity at spaced points along the trajectory thereof.

The basic idea of the invention is that a counting device as used in the known Doppler radar sets will not be considerably more expensive by the addition of some further counting stages, whether binary or decimal, but the addition of such further counter elements or stages will cause a very great increase in the counting capacity of the device. It has been found that the counter with the addition of relatively few extra counter stages can easily cover the entire length of the trajectory which is used for measuring purposes. Hereby it will be possible to arbitrarily preselect the measuring points or lengths along the trajectory.

According to the invention, therefore, the counting device is designed for consecutively counting all Doppler oscillations along the entire length of the trajectory used for measuring purposes, whereas means are provided for producing a control signal for starting a time measuring device for a limited number of following Doppler oscillations in at least two different counter stages.

In the following the invention will be described in more detail with reference to the accompanying drawing which represents a block diagram of a Doppler radar device according to the invention.

Though the invention is mainly related to the combination inside the frame $a$, the other parts of the apparatus should also be briefly described:

A high frequency generator 2 produces a transmitting signal to a combined transmitting and receiving antenna 4 which also serves to receive a part of the wave reflected from a flying object 6. This reflected signal is mixed in a mixer stage 8 with a corresponding part of the transmitting signal. Since the reflected signal has a slightly reduced frequency, a low frequency Doppler signal is hereby obtained, as is known in the art. The Doppler signal is passed through a low frequency amplifier 10 and a pass filter 12 to a pulse generator 14 and to a voltage level detector 16. The signal, now in pulse form, is conducted to a gate 18 which is connected with the level detector 16 in such a way that the gate can be opened only by the appearance of a Doppler signal.

The gate 18 is connected with the trigger terminal of a counting device 20 including a row of binary counting elements, for example twelve in number, whereby the counter is able to continuously count the Doppler pulses occurring over the entire length of that part of the trajectory of the flying object 6 which is used for measuring purposes. The counter 20 is connected with several "and gates" 22, 24, 26 and 28 in a manner known per se. These gates produce at different times an output signal in response to the corresponding preselected counter stages being actuated. The gates are connected in pairs to gates 30 and 32 in such a manner that an output impulse from the gate 22 serves to open the gate 30, whereafter an impulse from the gate 24 closes the gate 30. The gates 26 and 28 influence the gate 32 in a corresponding manner. When the gate 30 and the gate 32 are open, there is a connection between a measuring wave generator 34 and a measuring wave counter or indicating device 36, and respectively 40. This arrangement should need no further detailed description since the circuits are easily made by those skilled in the art when the desired functional characteristics are given.

By means of the arrangement described the interval between the counter stage operating the gate 22 and the counter stage operating the gate 24 can be measured with high accuracy by the counter 36, for example by using a measuring wave of 1 MHz. Correspondingly, the time for the Doppler oscillations between the counter stage operating the gate 26 and that operating the gate 28 will be measured by means of the measuring wave period counter 40. If desired, a recording device 38 may be used in a manner known per se for recording the results of the measurement.

The numerical interval between the gates 22 and 24 and between the gates 26 and 28 may be chosen so that the corresponding measuring portions of the trajectory have a length of for example 1 meter which can be done because the approximate velocity of the object is normally known in advance. The counter 20 may be adapted to count for example 1024 or 2048 Doppler oscillations, and the two measuring portions of the trajectory, as defined in the counter by the numerical distance between the gates 22 and 24 and between the gates 26 and 28, may correspond for example to 60–80 Doppler oscillations.

It will be possible to work with more than two measuring trajectory portions if desired, since start and stop impulses for the time measuring devices may be derived from any desired counting stage by corresponding adaption of the numerical positions and the number of "and" gates used.

The gates 22, 24, 26, and 28 may be connected directly by soldered connections to the corresponding counter stages when the Doppler radar device should be used for the measuring of flying objects of one kind only under standard measuring conditions, for example when the Doppler radar is used as stationary equipment belonging to a ship gun. However, the connection between the "and" gates and the counter 20 may be established by means of plugs so that a desired number of gates may be connected to the counter at any of the desired counter stages chosen from case to case by the operator. A corresponding adjustable arrangement may easily be made by means of manually adjustable selectors. In this manner both the positions of the measuring trajectory portions on the trajectory and the separate lengths of these portions can be determined arbitrarily by the operator while the radar device itself can be produced and sold as a standard device which conditions a relatively low price.

It is the main feature of the invention that the start impulses for the single measurements are derived directly from two or more counter stages in a counter covering the entire length of that part of the trajectory which is used for measuring purposes. In the embodiment described also the stop impulses for the measurements are derived from the same counter, but these stop impulses may well be produced by other means; for example, the start impulses may be used for starting a separate counter for the Doppler oscillations whereby the stop impulse is produced when this separate counter has counted a predetermined number of Doppler oscillations. In this case the gates 24 and 28 are unnecessary, and the gates 30 and 32 contain separate counters having a counting input connected to the output from the gate 18 as shown in dotted lines in the drawing. When these separate counters are counted full, they produce a stop signal which is passed to the gates 30 and 32 through the same terminals as used in the first embodiment for the connection of the gates to the "and" gates 24 and 28, respectively.

In another embodiment the gates 30 and 32 may include a timing device being started simultaneously with the opening of these gates in response to a start impulse from the "and" gates 22 and 26. After a preselected time the timing device produces a stop impulse which is used to close the gate 30 or 32 instead of stop impulses from the "and" gates 24 and 28. In this case the measuring wave generator 34 is substituted by a direct connection wave generator to the output from the gate 18. Hereby the velocity will be measured in terms of Doppler oscillations per time unit; these results, however, will not have the accuracy normally required.

The counter 20 stops its operation when it is counted full. The counter is preferably manually reset prior to the next measuring process, but the resetting can also take place automatically at the firing of the gun. The resetting circuit will be known by those skilled in the art.

What is claimed is:

1. A Doppler radar device for measuring the velocity of a moving object in at least two different portions of the trajectory of said object by determining the ratio between a time interval and the number of Doppler oscillations occurring within said time interval in each of said trajectory portions, comprising means for producing a series of Doppler oscillations in response to said object moving in said trajectory, counter means for consecutively counting the Doppler oscillations occurring during the movement of said object along the entire length of that part of said trajectory which is used for measuring purposes, said counter means being connected to means for producing a start impulse in response to each of at least a first and a second preselected count being reached during the consecutive counting of said Doppler oscillations in said counter means, measuring means operable in response to each of said start impulses to commence registration of the number of following Doppler oscillations, and stop impulse producing means connected to said counter means and said measuring means and operable to stop the registering action thereof by application to said measuring means of a stop impulse at the end of said time interval subsequent to each of said start impulses.

2. A Doppler radar means as claimed in claim 1, in which said measuring device comprises a time measuring instrument operatively connected with said start impulse producing means and said stop impulse producing means so as to be operable to start and stop in response to these impulses being produced, said stop impulse producing means being constituted by means for deriving an impulse from said counter means in response to at least a third and a fourth preselected count being reached in said counter means, so that said counter means is provided with start more stop impulse deriving means in at least four different counting stages.

3. A Doppler radar device as claimed in claim 2, in which each of said stop impulse producing means are adjustably connected to said counter means providing for connectability to any desired counter stage.

4. A Doppler radar device as claimed in claim 1, in which there is provided a separate measuring means in operative connection with each of said start and stop impulse producing means connected to said counter means.

5. A Doppler radar device as claimed in claim 1, in which each of said start impulse producing means are adjustably connected to said counter means providing for connectability to any desired counter stage.

6. A Doppler radar device as claimed in claim 1, wherein said means for producing a start impulse includes first and second "and" gates connected to said counter means so as to produce respective start impulse at said first and second preselected counts for controlling operation of said measuring means.

7. A Doppler radar device as claimed in claim 6 wherein said measuring means includes a pulse generator, at least one pulse counter and a gate circuit connected to each "and" gate and responsive to the start impulse thereof for connecting said pulse generator to said pulse counter.

8. A Doppler radar device as claimed in claim 7 wherein said stop impulse producing means includes third and fourth "and" gates connected to said counter means so as to produce stop impulses respectively at a given time interval subsequent to each start impulse at third and fourth preselected counts for de-activating said gate circuit.

9. A Doppler radar device as claimed in claim 6, wherein said measuring means includes a pulse generator, first and second pulse counters, and first and second gate circuits responsive to the control output of one of said "and" gates for connecting said pulse generator to a respective pulse counter.

10. A Doppler radar device as claimed in claim 9, wherein said stop impulse producing means includes third and fourth "and" gates connected to said counter means so as to produce stop impulses at third and fourth preselected counts of said counter means at a given time interval subsequent to each start impulse for de-activating said first and second gate circuits, respectively.

References Cited

UNITED STATES PATENTS

| | | | |
|---|---|---|---|
| 2,752,593 | 6/1956 | Downs | 343—8 |
| 2,851,596 | 9/1958 | Hilton | 324—68 |
| 3,034,049 | 5/1962 | Downs | 343—8 X |
| 3,267,474 | 8/1966 | Greenlee et al. | 324—78 |

RODNEY D. BENNETT, *Primary Examiner.*

C. L. WHITHAM, *Assistant Examiner.*